(12) United States Patent
Furukawa

(10) Patent No.: US 11,512,625 B2
(45) Date of Patent: Nov. 29, 2022

(54) PRECOMBUSTION CHAMBER ENGINE

(71) Applicant: MITSUBISHI HEAVY INDUSTRIES ENGINE & TURBOCHARGER, LTD., Sagamihara (JP)

(72) Inventor: Yuuta Furukawa, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/598,042

(22) PCT Filed: Aug. 29, 2019

(86) PCT No.: PCT/JP2019/033858
§ 371 (c)(1),
(2) Date: Sep. 24, 2021

(87) PCT Pub. No.: WO2020/217558
PCT Pub. Date: Oct. 29, 2020

(65) Prior Publication Data
US 2022/0162981 A1    May 26, 2022

(30) Foreign Application Priority Data
Apr. 22, 2019    (JP) .............................. JP2019-080785

(51) Int. Cl.
*F02B 19/16*    (2006.01)
*F02B 19/10*    (2006.01)
*F02B 19/12*    (2006.01)

(52) U.S. Cl.
CPC .......... *F02B 19/16* (2013.01); *F02B 19/1004* (2013.01); *F02B 19/12* (2013.01)

(58) Field of Classification Search
CPC .............. F02B 19/1004; F02B 19/1019; F02B 19/108; F02B 19/12; F02B 19/16; F02B 19/18
(Continued)

(56) References Cited

U.S. PATENT DOCUMENTS 1,762,550 A * 6/1930 French .................... F02B 19/14
                                                  123/271
2,026,822 A * 1/1936 Close ...................... H01T 13/54
                                                  313/142
(Continued)

FOREIGN PATENT DOCUMENTS

DE            936546 C   * 12/1955
EP            2998538 A1 *  3/2016   .............. F02B 19/08
(Continued)

OTHER PUBLICATIONS

International Preliminary Report on Patentability and the Written Opinion of the International Searching Authority for International Application No. PCT/JP2019/033858, dated Nov. 4, 2021, with an English translation.
(Continued)

*Primary Examiner* — John M Zaleskas
(74) *Attorney, Agent, or Firm* — Birch, Stewart, Kolasch & Birch, LLP

(57) ABSTRACT

A precombustion chamber engine comprises: a cylinder head defining a main combustion chamber together with a cylinder liner and a piston top surface; a precombustion chamber cap mounted on the cylinder head by inserting a distal end portion of the precombustion chamber cap into an insertion hole formed in the cylinder head; a precombustion chamber holder disposed inside the cylinder head; and a precombustion chamber cap holding member fixed to the precombustion chamber holder and configured to suspend and support the precombustion chamber cap. The precombustion chamber cap includes a reduced diameter portion with a diameter decreasing from a proximal end portion of the precombustion chamber cap to an intermediate portion that has a smaller diameter than the proximal end portion. The precombustion chamber cap holding member is configured to lock the reduced diameter portion and to have a gap
(Continued)

between the precombustion chamber cap holding member and the proximal end portion when the precombustion chamber cap holding member suspends and supports the precombustion chamber cap.

11 Claims, 8 Drawing Sheets

(58) Field of Classification Search
USPC .................................................. 123/266, 273
See application file for complete search history.

(56) References Cited

U.S. PATENT DOCUMENTS

| | | | | | |
|---|---|---|---|---|---|
| 2,292,409 | A | * | 8/1942 | Steward | F02B 19/1004 239/289 |
| 2,436,090 | A | * | 2/1948 | Bodine, Jr. | F02M 61/00 123/266 |
| 2,804,858 | A | * | 9/1957 | Schilling | F02B 19/14 123/270 |
| 2,932,289 | A | * | 4/1960 | Witzky | F02B 23/04 123/284 |
| 3,117,564 | A | * | 1/1964 | May | F02M 53/04 123/275 |
| 3,884,211 | A | * | 5/1975 | Yagi | F02B 19/1004 123/260 |
| 4,029,075 | A | * | 6/1977 | Noguchi | F02B 19/1066 123/169 PA |
| 4,224,980 | A | * | 9/1980 | Buchner | F02B 23/00 165/277 |
| 4,416,228 | A | * | 11/1983 | Benedikt | F02B 19/1009 123/169 EL |
| 4,426,966 | A | * | 1/1984 | Huther | F02B 19/165 123/270 |
| 4,509,476 | A | * | 4/1985 | Breuser | F02B 19/12 123/26 |
| 4,620,516 | A | * | 11/1986 | Reum | F02M 53/06 123/297 |
| 4,646,695 | A | * | 3/1987 | Blackburn | F02B 19/12 123/266 |
| 4,926,818 | A | * | 5/1990 | Oppenheim | F02B 19/109 123/297 |
| 5,421,300 | A | * | 6/1995 | Durling | F02B 19/12 123/266 |
| 5,778,849 | A | * | 7/1998 | Regueiro | F02B 19/16 123/254 |
| 5,915,351 | A | * | 6/1999 | Regueiro | F02B 19/16 123/285 |
| 5,924,402 | A | * | 7/1999 | Regueiro | F02B 19/14 123/254 |
| 5,934,244 | A | * | 8/1999 | Walenta | F02B 19/16 123/261 |
| 2005/0016495 | A1 | * | 1/2005 | Lampard | F02B 19/12 123/261 |
| 2007/0236122 | A1 | * | 10/2007 | Borror | H01T 13/54 313/118 |
| 2011/0005478 | A1 | * | 1/2011 | Taliaferro | F02B 19/1095 123/285 |
| 2011/0308489 | A1 | * | 12/2011 | Herden | F02B 19/18 123/143 B |
| 2012/0037108 | A1 | * | 2/2012 | Herden | F02P 13/00 123/143 B |
| 2012/0103302 | A1 | * | 5/2012 | Attard | F02B 19/1057 123/260 |
| 2014/0053799 | A1 | * | 2/2014 | Taliaferro | F02B 19/1014 123/254 |
| 2014/0069370 | A1 | * | 3/2014 | Taliaferro | F02B 19/1009 123/254 |
| 2016/0024995 | A1 | | 1/2016 | Trinkel | |
| 2016/0061094 | A1 | * | 3/2016 | Taliaferro | F02B 19/12 123/254 |
| 2016/0138540 | A1 | * | 5/2016 | Franks | F02M 61/14 123/470 |
| 2016/0312685 | A1 | * | 10/2016 | Furukawa | F02B 43/00 |
| 2017/0218913 | A1 | * | 8/2017 | Kanehara | F02B 19/12 |
| 2021/0079874 | A1 | * | 3/2021 | Berger | F02M 21/0248 |

FOREIGN PATENT DOCUMENTS

| | | | | |
|---|---|---|---|---|
| FR | 1294906 | A | * | 6/1962 |
| JP | 2011-503416 | A | | 1/2011 |
| JP | 2012-518120 | A | | 8/2012 |
| JP | 2013-520600 | A | | 6/2013 |
| JP | 2015-117582 | A | | 6/2015 |
| WO | WO-2015136143 | A1 | * | 9/2015 .......... F02B 19/1004 |

OTHER PUBLICATIONS

International Search Report for International Application No. PCT/JP2019/033858, dated Nov. 12, 2019.

* cited by examiner (A)

(B)

PRECOMBUSTION CHAMBER ENGINE

TECHNICAL FIELD

The present disclosure relates to a precombustion chamber engine.

BACKGROUND

Conventionally, a precombustion chamber engine is known as a type of engine that has a precombustion chamber for ignition in a cylinder head. Further, a precombustion chamber gas engine is known as a type of precombustion chamber engine that is operated by combustion of gaseous fuel (fuel gas). In the precombustion chamber gas engine, a mixture of fuel gas and air is supplied to the main combustion chamber in the cylinder head, and fuel gas is supplied to the precombustion chamber. A precombustion-chamber forming portion that forms the precombustion chamber includes a cap (precombustion chamber cap) for supplying a flame to the main combustion chamber and a precombustion chamber holder for holding the cap. When the fuel gas in the main combustion chamber is compressed by a piston, the fuel gas in the precombustion chamber is ignited by an ignition plug installed in the precombustion chamber to generate a flame, and the flame is injected through the cap into the main combustion chamber to ignite the air-fuel mixture in the main combustion chamber, and the combustion operation of the precombustion chamber gas engine is performed.

Regarding the precombustion chamber engine, for example, Patent Document 1 discloses a configuration where the precombustion chamber cap is held by the precombustion chamber holder by applying a pressing force to the precombustion chamber cap using a fastening member such as a bolt from a direction crossing the central axis of the precombustion chamber cap to press the cap against the inner wall of the precombustion chamber holder.

CITATION LIST

Patent Literature

Patent Document 1: JP2015-117582

SUMMARY

Problems to be Solved

However, in the configuration where the precombustion chamber cap is held by the precombustion chamber holder by the fastening force applied from the side as in the precombustion chamber engine of Patent Document 1, it is difficult to adjust the position of the precombustion chamber cap by the bolt, and it cannot be said that the assembly of the precombustion-chamber forming portion to the cylinder head is easy, and there is room for further improvement.

In view of the above, an object of at least one embodiment of the present invention is to provide a precombustion chamber engine with improved ease of assembly.

Solution to the Problems (1) A precombustion chamber gas engine according to at least one embodiment of the present invention comprises: a cylinder head defining a main combustion chamber together with a cylinder liner and a piston top surface; a precombustion chamber cap mounted on the cylinder head by inserting a distal end portion of the precombustion chamber cap into an insertion hole formed in the cylinder head; a precombustion chamber holder disposed inside the cylinder head; and a precombustion chamber cap holding member fixed to the precombustion chamber holder and configured to suspend and support the precombustion chamber cap. The precombustion chamber cap includes a reduced diameter portion with a diameter decreasing from a proximal end portion of the precombustion chamber cap to an intermediate portion that has a smaller diameter than the proximal end portion. The precombustion chamber cap holding member is configured to lock the reduced diameter portion and to have a gap between the precombustion chamber cap holding member and the proximal end portion when the precombustion chamber cap holding member suspends and supports the precombustion chamber cap.

The central axes of the precombustion chamber holder and the insertion hole in the cylinder head of the precombustion chamber engine may be displaced from each other in a direction crossing the central axis of the precombustion chamber cap (e.g., horizontal direction).

In this regard, according to the above configuration (1), the precombustion chamber cap is suspended and supported while the reduced diameter portion of the precombustion chamber cap is locked by the precombustion chamber cap holding member fixed to the precombustion chamber holder, and a gap is secured between the precombustion chamber cap holding member and the proximal end portion of the precombustion chamber cap. Thus, when the precombustion chamber cap is assembled in the insertion hole of the cylinder head, the positional displacement of the precombustion chamber cap with respect to the precombustion chamber holder is allowed by the gap. In other words, when the precombustion chamber cap is assembled to the cylinder head, the positioning of the precombustion chamber cap can be easily performed while absorbing the positional displacement of the central axes of the precombustion chamber holder and the insertion hole, so that it is possible to provide the precombustion chamber engine with improved ease of assembly.

(2) In some embodiments, in the above configuration (1), the precombustion chamber cap holding member may include: a cylindrical large diameter portion fixed to the precombustion chamber holder; and a holding portion connected to the large diameter portion and disposed below the large diameter portion. The holding portion has a distal end disposed closer to a central axis of the precombustion chamber cap than an outer peripheral surface of the proximal end portion is.

According to the above configuration (2), the reduced diameter portion of the precombustion chamber cap is locked by the distal end of the holding portion disposed closer to the central axis of the precombustion chamber cap than the outer peripheral surface of the proximal end portion of the precombustion chamber cap is. With the configuration where the precombustion chamber cap is assembled to the cylinder head with the precombustion chamber cap suspended and supported by the precombustion chamber holder via the precombustion chamber cap holding member, it is possible to provide the precombustion chamber engine with improved ease of assembly.

(3) In some embodiments, in the above configuration (2), the precombustion chamber holder may include a male threaded portion formed on an outer periphery of the precombustion chamber holder. The precombustion chamber cap holding member may include a female threaded portion formed on an inner periphery of the large diameter portion of the precombustion chamber cap holding member to be engaged with the male threaded portion.

According to the above configuration (3), with the simple configuration where the female threaded portion formed on the inner periphery of the large diameter portion of the precombustion chamber cap holding member is engaged with the male threaded portion formed on the outer periphery of the precombustion chamber holder, the precombustion chamber cap can be held by the precombustion chamber holder. Thus, it is possible to provide the precombustion chamber engine with improved ease of assembly.

(4) In some embodiments, in the above configuration (2) or (3), the holding portion may include a tapered portion formed so as to be closer to the central axis with an increase in distance from the large diameter portion along a direction of the central axis.

According to the above configuration (4), with the configuration where the reduced diameter portion of the precombustion chamber cap is locked by the holding portion including the tapered portion, it is possible to provide the precombustion chamber engine with improved ease of assembly, as described in the above (2) or (3).

(5) In some embodiments, in the above configuration (2) or (3), the holding portion may include an inner flange portion protruding inward from a lower end of the large diameter portion so as to cross a direction of the central axis.

According to the above configuration (5), with the configuration where the reduced diameter portion of the precombustion chamber cap is locked by the holding portion including the inner flange portion, it is possible to provide the precombustion chamber engine with improved ease of assembly, as described in the above (2) or (3).

(6) In some embodiments, in any one of the above configurations (1) to (5), the proximal end portion of the precombustion chamber cap may have a smaller diameter than the precombustion chamber holder.

According to the above configuration (6), with the configuration where the precombustion chamber cap and the precombustion chamber holder are fastened via the precombustion chamber cap holding member, the precombustion chamber cap having a smaller diameter than the precombustion chamber holder, i.e., a different diameter from the precombustion chamber holder, can be smoothly held by the precombustion chamber holder. Thus, it is possible to provide the precombustion chamber engine that is flexible to differences in dimension in the radial direction of the precombustion chamber cap.

(7) In some embodiments, in any one of the above configurations (1) to (6), the precombustion chamber engine may further comprise a seal member interposed between the precombustion chamber holder and the proximal end portion of the precombustion chamber cap or between a lower end surface of the intermediate portion of the precombustion chamber cap and the cylinder head.

According to the above configuration (7), by fastening the precombustion chamber holder and the precombustion chamber cap with the seal member interposed therebetween, the sealing performance between the precombustion chamber holder and the precombustion chamber cap can be improved compared to the case where the seal member is not interposed between the precombustion chamber holder and the precombustion chamber cap, so that it is possible to prevent fuel from leaking through a gap between the precombustion chamber cap and the precombustion chamber holder, for example.

(8) In some embodiments, in any one of the above configurations (1) to (7), the precombustion chamber holder may include a first recess on a surface facing the precombustion chamber cap. The precombustion chamber cap may include a second recess on a surface facing the precombustion chamber holder. The precombustion chamber engine may be configured such that a pin member is fitted in the first recess and the second recess.

According to the above configuration (8), since the pin member is interposed between the precombustion chamber holder and the precombustion chamber cap, when the precombustion chamber cap is held by the precombustion chamber holder via the precombustion chamber cap holding member, it is possible to prevent the precombustion chamber cap and the precombustion chamber cap holding member from rotating together. Thus, it is possible to provide the precombustion chamber engine with improved ease of assembly.

(9) In some embodiments, in any one of the above configurations (1) to (8), the precombustion chamber engine may further comprise a fuel gas supply section for supplying gaseous fuel into the main combustion chamber.

According to the above configuration (9), in a so-called gas-type engine driven by gaseous fuel, it is possible to achieve the effect described in any one of the above (1) to (8).

(10) In some embodiments, in any one of the above configurations (1) to (9), the precombustion chamber cap holding member may include a clamp for fastening the precombustion chamber holder with the precombustion chamber cap.

According to the above configuration (10), with the simple configuration where the precombustion chamber holder and the precombustion chamber cap are clamped by the clamp, it is possible to achieve the effect described in any one of the above (1) to (9).

(11) In some embodiments, in the above configuration (2) or any one of the above configurations (4) to (10), the precombustion chamber holder may be connected to the precombustion chamber cap holding member by being press-fitted in the large diameter portion of the precombustion chamber cap holding member.

According to the above configuration (11), with the simple configuration where the precombustion chamber holder is connected to the precombustion chamber cap holding member by press-fitting the precombustion chamber holder in the large diameter portion of the precombustion chamber cap holding member, it is possible to achieve the effect described in any one of the above (1) to (7).

Advantageous Effects

At least one embodiment of the present invention provides a precombustion chamber engine with improved ease of assembly.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

First, a schematic configuration of a precombustion chamber engine according to an embodiment of the present disclosure will be described.

Figure 1:
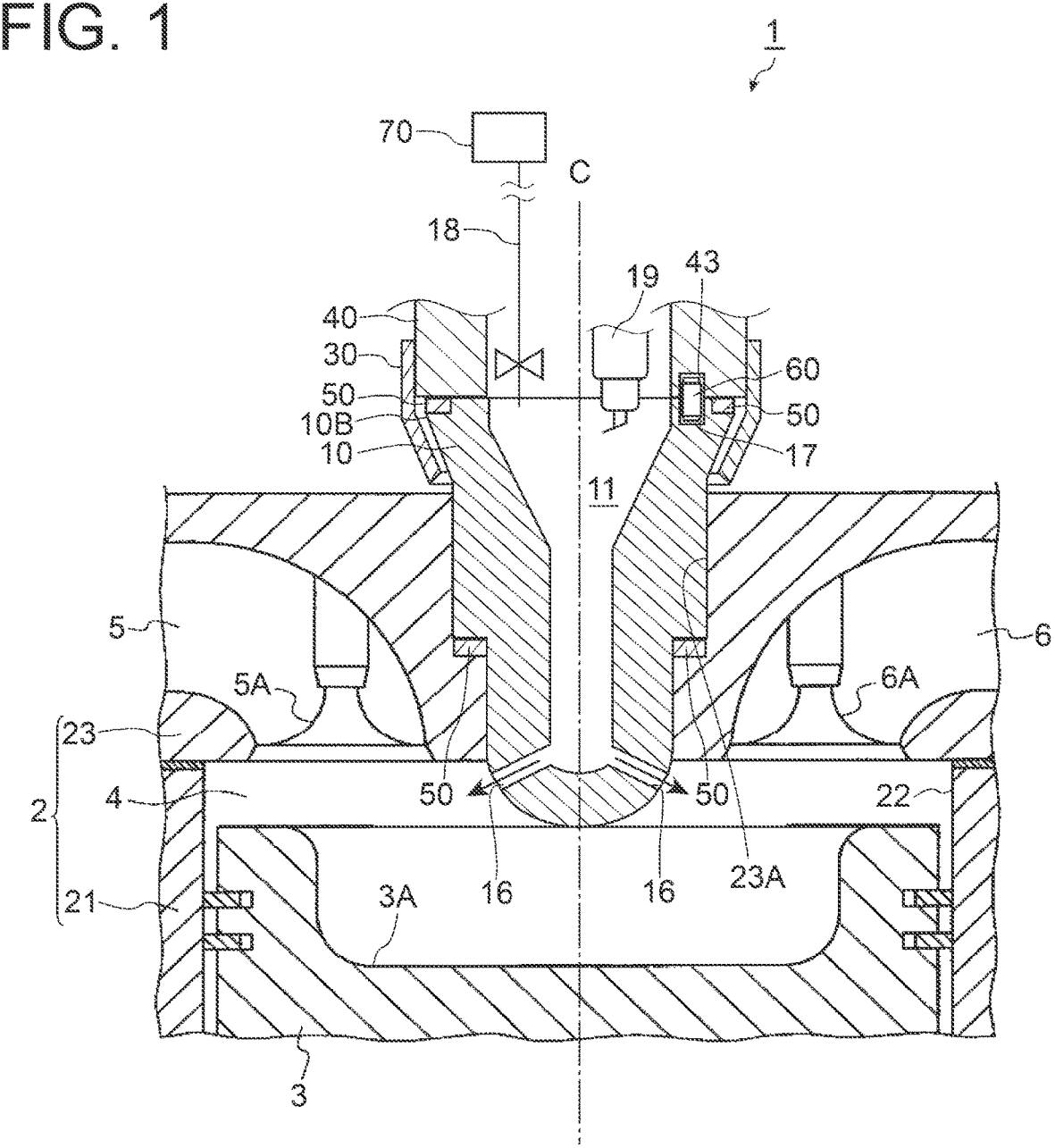
FIG. 1 is a longitudinal cross-sectional view showing a configuration example of a precombustion chamber engine according to an embodiment of the present disclosure.
Figure 2:
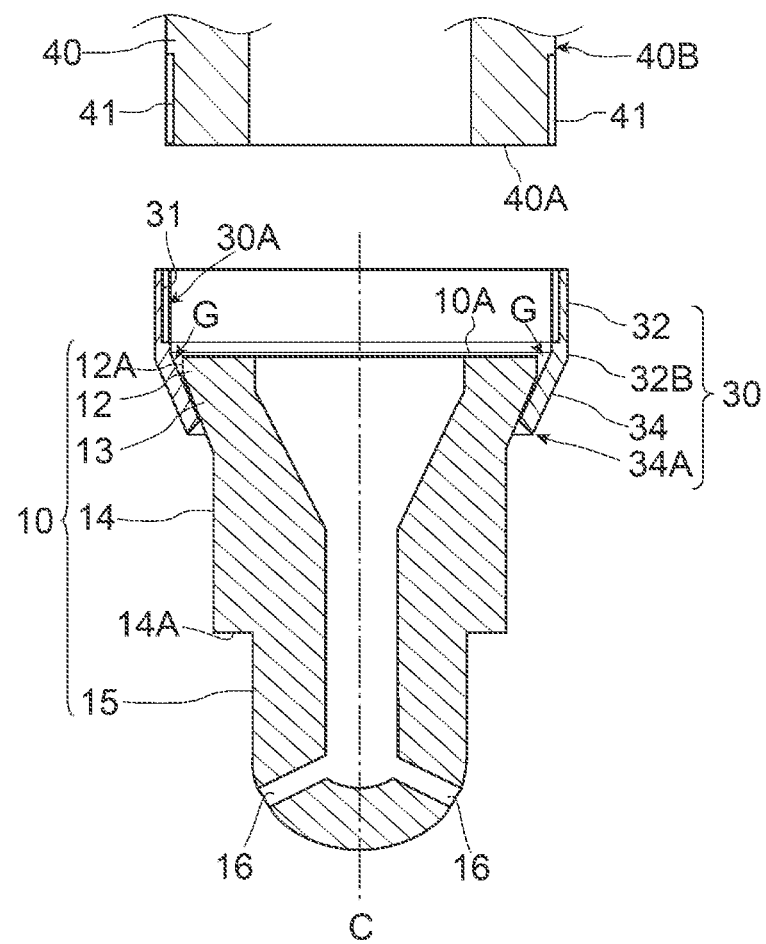
FIG. 2 is a schematic diagram showing a configuration example of a precombustion chamber cap holding member according to an embodiment.

FIG. 1 is a longitudinal cross-sectional view showing a configuration example of a precombustion chamber engine according to an embodiment of the present disclosure. FIG. 2 is a schematic diagram showing a configuration example of a precombustion chamber cap holding member according to an embodiment.

As illustrated non-limitingly in FIGS. 1 and 2, a precombustion chamber engine 1 according to at least one embodiment of the present invention includes a cylinder head 23 defining a main combustion chamber 4 (main chamber) together with a cylinder liner 22 and a piston top surface 3A, a precombustion chamber cap 10 mounted on the cylinder head 23 by inserting a distal end portion 15 into an insertion hole 23A formed in the cylinder head 23, a precombustion chamber holder 40 disposed inside the cylinder head 23, and a precombustion chamber cap holding member 30 fixed to the precombustion chamber holder 40 and configured to suspend and support the precombustion chamber cap 10. The precombustion chamber engine 1 further includes, in addition to the above-described components, an intake port 5 disposed on the cylinder head 23, an intake valve 5A for opening and closing the intake port 5, an exhaust port 6 disposed on the cylinder head 23, and an exhaust valve 6A for opening and closing the exhaust port 6, for example.

The cylinder head 23 has a precombustion chamber 11 (auxiliary chamber), and the main combustion chamber 4 and the precombustion chamber 11 are communicated through at least one injection port 16 (injection hole). The precombustion chamber 11 is connected to an ignition fuel supply passage 18 for introducing ignition fuel (e.g., fuel gas) to the precombustion chamber 11. Further, the precombustion chamber 11 is equipped with an ignition plug 19 to ignite the air-fuel mixture containing the ignition fuel introduced into the precombustion chamber 11. Combustion gas generated in the precombustion chamber 11 is injected as a torch through the injection port 16 shown in FIG. 1 to combust the mixed gas in the main combustion chamber 4.

The precombustion chamber cap 10 includes a reduced diameter portion 13 with a diameter decreasing from the proximal end portion 12 of the precombustion chamber cap 10 to an intermediate portion 14 that has a smaller diameter than the proximal end portion 12.

More specifically, the precombustion chamber cap 10 includes a proximal end portion 12 (large diameter portion) with an upper end surface 10A facing the precombustion chamber holder 40, an intermediate portion 14 disposed farther from the precombustion chamber holder 40 than the proximal end portion 12 in the direction of the central axis C and having a smaller diameter than the proximal end portion 12, a reduced diameter portion 13 disposed between the proximal end portion 12 and the intermediate portion 14 and connecting the outer peripheral edge of the proximal end portion 12 to the outer peripheral edge of the intermediate portion 14 in a smooth and continuous manner, and a distal end portion 15 having a smaller diameter than the intermediate portion 14.

The distal end portion 15 of the precombustion chamber cap 10 has at least one injection hole 16.

The lower end portion of the precombustion chamber holder 40 may have substantially the same diameter as the upper portion (proximal end portion 12) of the precombustion chamber cap 10.

The precombustion chamber cap holding member 30 is configured to lock the reduced diameter portion 13 and to have a gap between the precombustion chamber cap holding member 30 and the proximal end portion 12 when suspending and supporting the precombustion chamber cap 10. A gap G is formed between an inner peripheral surface 30A of the large diameter portion 32 of the precombustion chamber cap holding member 30 and an outer peripheral surface 12A of the proximal end portion 12 of the precombustion chamber cap 10. When the precombustion chamber cap 10 is suspended and supported by the precombustion chamber cap holding member 30, a gap is formed between the upper end surface 10A of the precombustion chamber cap 10 and a lower end surface 40A of the precombustion chamber holder 40. On the other hand, when the upper end surface 10A of the precombustion chamber cap 10 is in contact with the lower end surface 40A of the precombustion chamber holder 40, a gap G is secured between an outer peripheral surface 10B of the precombustion chamber cap 10 (more specifically, reduced diameter portion 13) and the inner peripheral surface 30A of the precombustion chamber cap holding member 30 (see FIG. 1).

Here, the central axes C of the precombustion chamber holder 40 and the insertion hole 23A in the cylinder head 23 of the precombustion chamber engine 1 may be displaced from each other in a direction crossing the central axis C of the precombustion chamber cap 10 (e.g., horizontal direction).

In this regard, as described above, according to the configuration where the precombustion chamber cap 10 is suspended and supported while the reduced diameter portion 13 of the precombustion chamber cap 10 is locked by the precombustion chamber cap holding member 30 fixed to the precombustion chamber holder 40, and a gap G is secured between the precombustion chamber cap holding member 30 and the proximal end portion 12 of the precombustion chamber cap 10, when the precombustion chamber cap 10 is assembled in the insertion hole 23A of the cylinder head 23, the positional displacement of the precombustion chamber cap 10 with respect to the precombustion chamber holder 40 is allowed by the gap G. In other words, when the precombustion chamber cap 10 is assembled to the cylinder head 23, the positioning of the precombustion chamber cap 10 can be easily performed while absorbing the positional displacement of the central axes C of the precombustion chamber holder 40 and the insertion hole 23A, so that it is possible to provide the precombustion chamber engine 1 with improved ease of assembly.

Further, in the configuration where the precombustion chamber cap is held by the precombustion chamber holder by pressing the fastening member such as a bolt from the side of the precombustion chamber cap, it is difficult to adjust the position of the precombustion chamber cap by the bolt screwed from the side, but in the configuration of the present disclosure, it is easy to adjust the position of the precombustion chamber cap.

In some embodiments, in any one of the above configurations, the precombustion chamber engine 1 may further include a fuel gas supply section 70 for supplying gaseous fuel (fuel gas) into the main combustion chamber 4 (see FIG. 1).

In other words, in some embodiments, the precombustion chamber engine 1 is configured as a precombustion chamber gas engine. The gaseous fuel may include natural gas or city gas, for example. In such a precombustion chamber engine 1, a mixture of fuel gas and air is supplied to the main combustion chamber 4 in the cylinder head 23, and fuel gas is supplied to the precombustion chamber 11. When the piston 3 is near the top dead center of compression in the main combustion chamber 4, and the fuel gas in the main combustion chamber 4 is compressed, the fuel gas supplied to the precombustion chamber 11 is ignited by the ignition plug 19 disposed in the precombustion chamber 11 to generate a flame from the precombustion chamber 11, and the flame is injected through the injection port 16 of the precombustion chamber cap 10 into the main combustion chamber 4. Then, the air-fuel mixture in the main combustion chamber 4 is ignited by the flame, and the combustion operation of the precombustion chamber gas engine is performed. Precombustion chamber gas engines are widely used in power generation engines for emergency and non-emergency use, engines for construction machinery, and engines installed in ships and trains, etc., because of their high efficiency and high output.

According to the configuration further including the fuel gas supply section 70, in a so-called gas-type engine driven by gaseous fuel, it is possible to achieve the effect described in any one of the embodiments of the present disclosure.

In some embodiments, for example as illustrated in FIG. 1, in any one of the above configurations, a seal member 50 (including a gasket, for example) is interposed between the precombustion chamber holder 40 and the proximal end portion 12 of the precombustion chamber cap 10 or between a lower end surface 14A (step portion) of the intermediate portion 14 of the precombustion chamber cap 10 and the cylinder head 23.

Thus, by fastening the precombustion chamber holder 40 and the precombustion chamber cap 10 with the seal member 50 interposed therebetween, the sealing performance between the precombustion chamber holder 40 and the precombustion chamber cap 10 can be improved compared to the case where the seal member 50 is not interposed between the precombustion chamber holder 40 and the precombustion chamber cap 10, so that it is possible to prevent fuel from leaking through a gap between the precombustion chamber cap 10 and the precombustion chamber holder 40, for example.

Further, for example in the configuration where the precombustion chamber cap 10 is held by the precombustion chamber holder 40 by applying a pressing force to the precombustion chamber cap 10 to press the cap against the inner wall of the precombustion chamber holder 40 from a direction crossing the central axis C of the precombustion chamber cap 10, it cannot be said that a sufficient pressing force can be applied in the direction of the central axis C (e.g., vertical direction), and there is room for further improvement, but in the precombustion chamber engine 1 of the present disclosure having the above configuration, since the sealing performance between the precombustion chamber cap 10 and the precombustion chamber holder 40 can be improved, the leakage of fuel through a gap between the precombustion chamber cap 10 and the precombustion chamber holder 40 can be reduced.

In some embodiments, in any one of the above configurations, the precombustion chamber holder 40 may include a first recess 43 on the lower end surface 40A facing the precombustion chamber cap 10. The precombustion chamber cap 10 may include a second recess 17 on the upper end surface 10A facing the precombustion chamber holder 40. A pin member 60 may be fitted in the first recess 43 and the second recess 17 (see FIG. 1).

Thus, according to the configuration where the pin member 60 is interposed between the precombustion chamber holder 40 and the precombustion chamber cap 10, when the precombustion chamber cap 10 is held by the precombustion chamber holder 40 via the precombustion chamber cap holding member 30, it is possible to prevent the precombustion chamber cap 10 and the precombustion chamber cap holding member 30 from rotating together. Thus, it is possible to provide the precombustion chamber engine 1 with improved ease of assembly.

In some embodiments, for example as illustrated in FIGS. 1 and 2, in the configuration described in any one of the embodiments of the present disclosure, the precombustion chamber cap holding member 30 may include a cylindrical large diameter portion 32 fixed to the precombustion chamber holder 40, and a holding portion 34 connected to the large diameter portion 32 and disposed below the large diameter portion 32, with a distal end disposed closer to the central axis C of the precombustion chamber cap 10 than the outer peripheral surface 12A of the proximal end portion 12.

Figure 3:
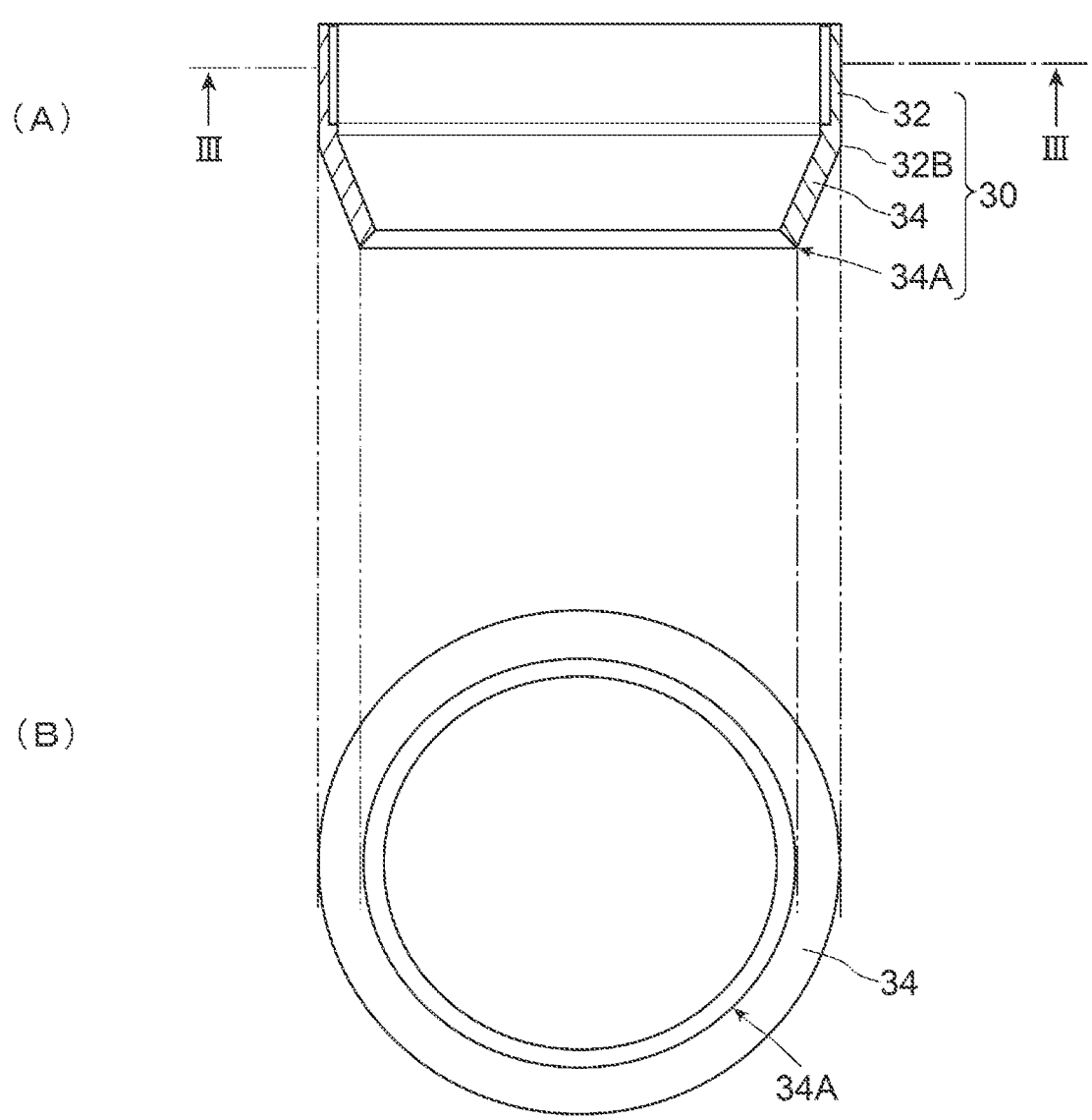
FIG. 3 is a schematic diagram showing a configuration example of a precombustion chamber cap holding member according to an embodiment. Part (A) is a longitudinal cross-sectional view, and part (B) is a cross-section taken along line in part (A) of FIG. 3.
Figure 4:
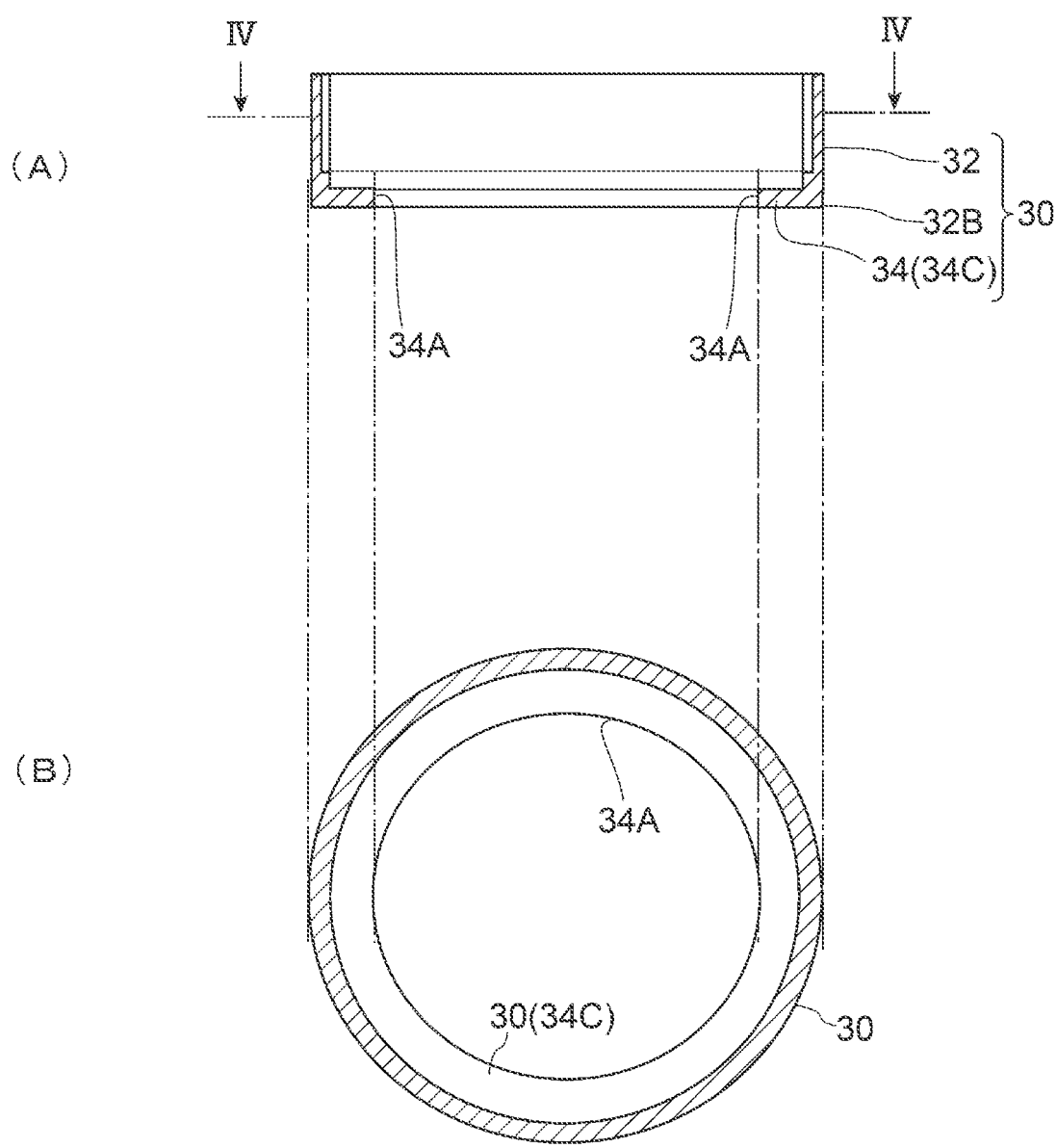
FIG. 4 is a schematic diagram showing a configuration example of a precombustion chamber cap holding member according to an embodiment. Part (A) is a longitudinal cross-sectional view, and part (B) is a cross-section taken along line IV-IV in part (A) of FIG. 3.

The holding portion 34 may be formed in an annular shape for example as illustrated in part (A) of FIG. 3, part (B) of FIG. 3, part (A) of FIG. 4, and part (B) of FIG. 4. Alternatively, the holding portion 34 may be formed in a claw or hook shape for example as illustrated in part (A) of FIG. 5, part (B) of FIG. 5, part (A) of FIG. 6, and part (B) of FIG. 6.

Thus, according to the configuration where the precombustion chamber cap holding member 30 includes the large diameter portion 32 and the holding portion 34, the reduced diameter portion 13 of the precombustion chamber cap 10 is locked by the distal end 34A of the holding portion 34 disposed closer to the central axis C of the precombustion chamber cap 10 than the outer peripheral surface 12A of the proximal end portion 12 of the precombustion chamber cap 10. With the configuration where the precombustion chamber cap 10 is assembled to the cylinder head 23 with the precombustion chamber cap 10 suspended and supported by the precombustion chamber holder 40 via the precombustion chamber cap holding member 30, it is possible to provide the precombustion chamber engine with improved ease of assembly.

In some embodiments, for example as illustrated in FIGS. 2 to 7, the precombustion chamber holder 40 may include a male threaded portion 41 formed on an outer periphery of the precombustion chamber holder 40. The precombustion chamber cap holding member 30 may include a female threaded portion 31 formed on an inner peripheral surface 32A of the large diameter portion 32 of the precombustion chamber cap holding member 30 to be engaged with the male threaded portion 41.

According to the configuration including the male threaded portion 41 and the female threaded portion 31, with the simple configuration where the female threaded portion 31 formed on the inner peripheral surface 32A of the large diameter portion 32 of the precombustion chamber cap holding member 30 is engaged with the male threaded portion 41 formed on the outer periphery 40B of the precombustion chamber holder 40, the precombustion chamber cap 10 can be held by the precombustion chamber holder 40. Thus, it is possible to provide the precombustion chamber engine 1 with improved ease of assembly.

Figure 5:
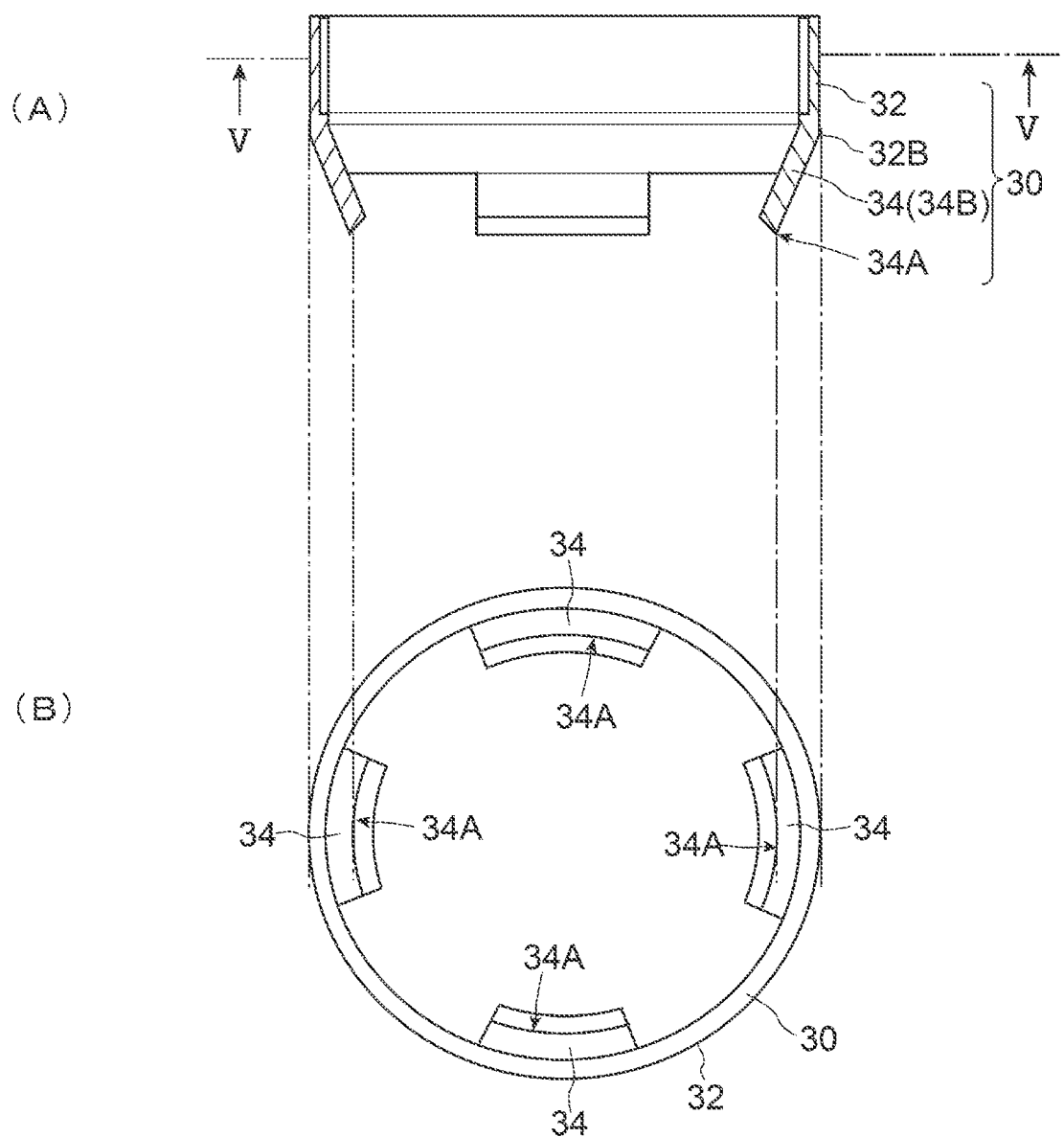
FIG. 5 is a schematic diagram showing a configuration example of a precombustion chamber cap holding member according to an embodiment. Part (A) is a longitudinal cross-sectional view, and part (B) is a cross-section taken along line V-V in part (A) of FIG. 3.

In some embodiments, in any one of the above configurations, the holding portion 34 may include a tapered portion 34B formed so as to be closer to the central axis C with an increase in distance from the large diameter portion 32 along the direction of the central axis C (for example, see part (A) of FIG. 3, part (B) of FIG. 3, part (A) of FIG. 5, and part (B) of FIG. 5).

According to the configuration where the reduced diameter portion 13 of the precombustion chamber cap 10 is locked by the holding portion 34 including the tapered portion 34B, for example when the precombustion chamber cap 10 is assembled to the cylinder head, the precombustion chamber cap 10 can be easily aligned, so that it is possible to provide the precombustion chamber engine 1 with improved ease of assembly.

Figure 6:
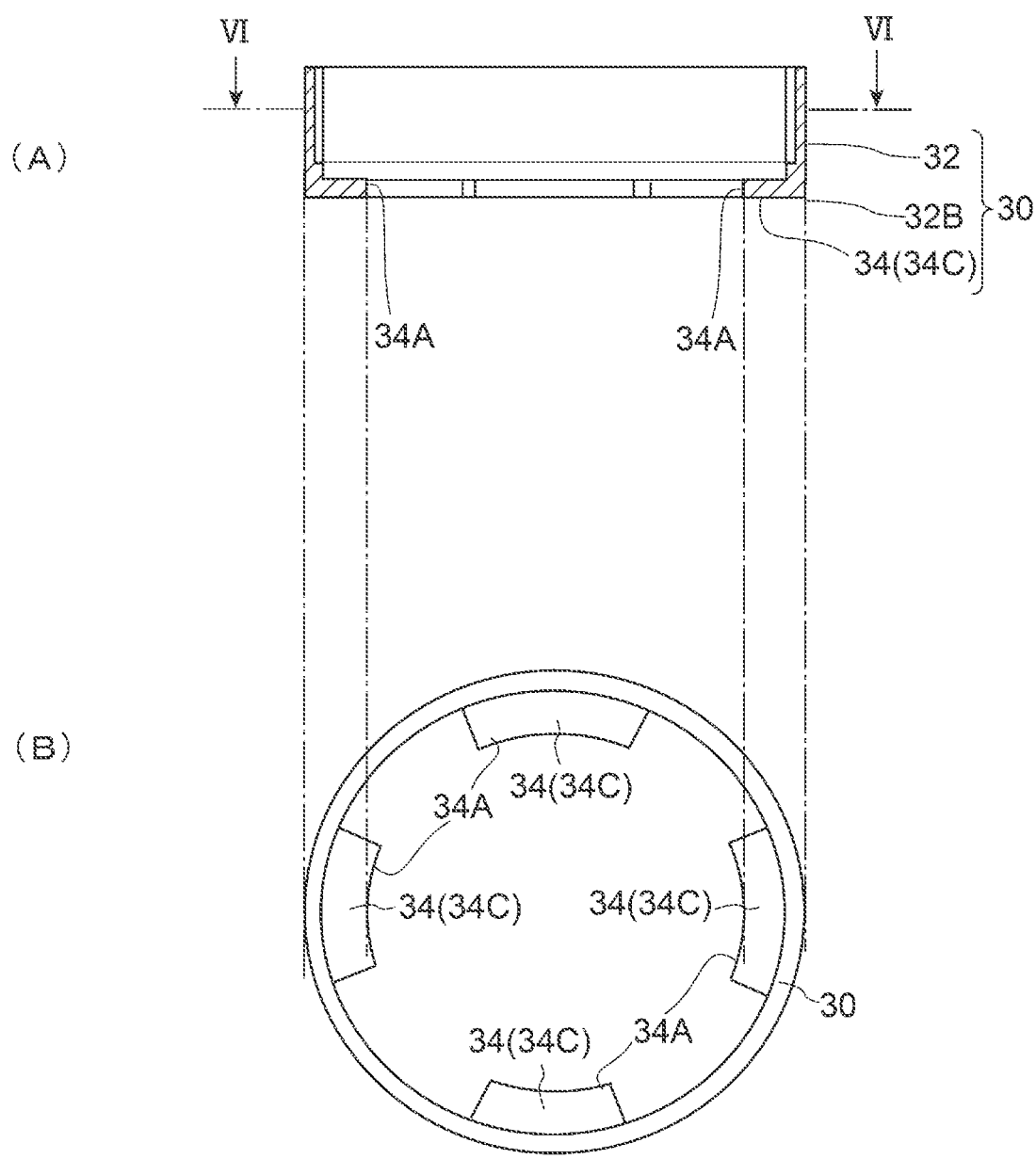
FIG. 6 is a schematic diagram showing a configuration example of a precombustion chamber cap holding member according to an embodiment. Part (A) is a longitudinal cross-sectional view, and part (B) is a cross-section taken along line VI-VI in part (A) of FIG. 3.

In some embodiments, for example as illustrated in part (A) of FIG. 4, part (B) of FIG. 4, part (A) of FIG. 6, and part (B) of FIG. 6, in any one of the above configurations, the holding portion 34 may include an inner flange portion 34C (flange portion) protruding inward from a lower end 32B of the large diameter portion 32 so as to cross the direction of the central axis C.

With the configuration where the reduced diameter portion 13 of the precombustion chamber cap 10 is locked by the holding portion 34 including the inner flange portion 34C, it is possible to provide the precombustion chamber engine 1 with improved ease of assembly.

Figure 7:
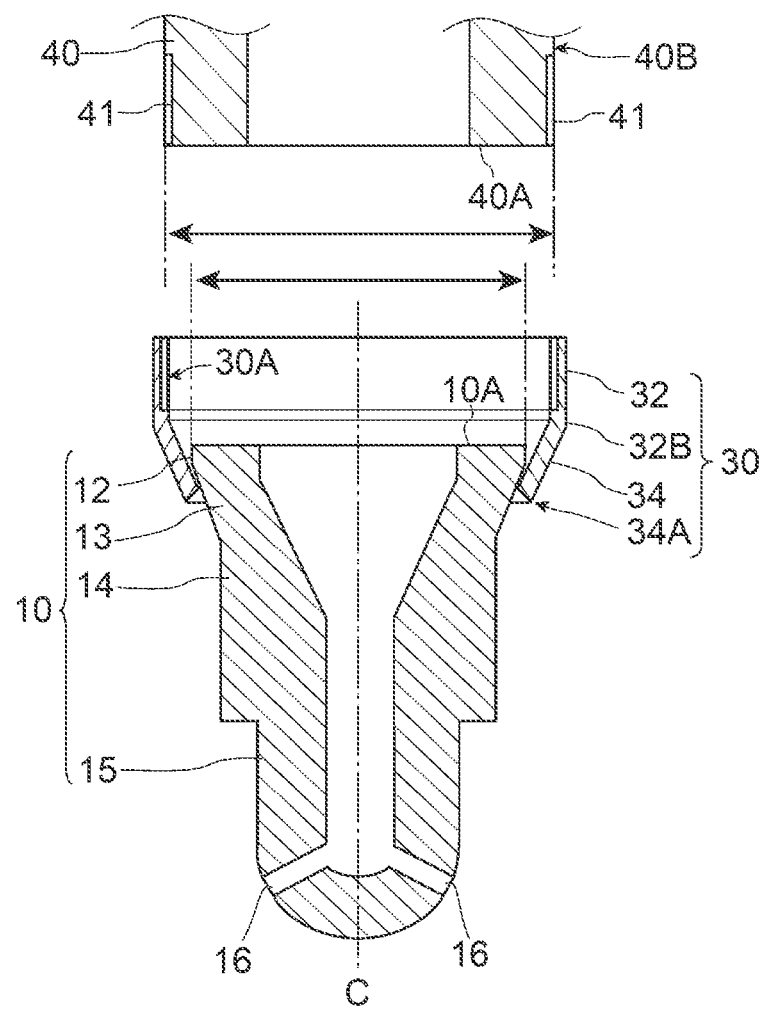
FIG. 7 is a schematic diagram showing a configuration example of a precombustion chamber cap holding member according to an embodiment.

In some embodiments, for example as illustrated in FIG. 7, in any one of the above configurations, the proximal end portion 12 of the precombustion chamber cap 10 may have a smaller diameter than the precombustion chamber holder 40.

Specifically, with the configuration where the precombustion chamber cap 10 and the precombustion chamber holder 40 are fastened via the precombustion chamber cap holding member 30, the precombustion chamber cap 10 having a smaller diameter than the precombustion chamber holder 40, i.e., a different diameter from the precombustion chamber holder 40, can be smoothly held by the precombustion chamber holder 40. Thus, it is possible to provide the precombustion chamber engine 1 that is flexible to differences in dimension in the radial direction of the precombustion chamber cap 10.

Figure 8A:
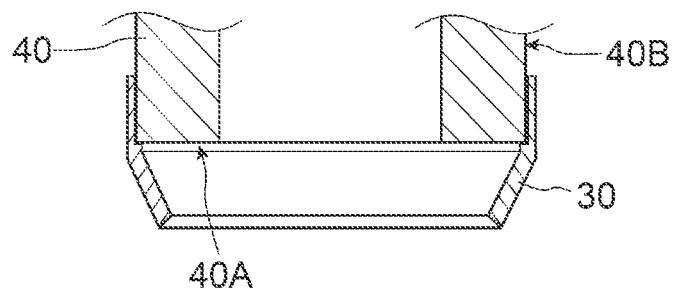
FIG. 8A is a schematic diagram showing a configuration example of a precombustion chamber cap holding member according to another embodiment, where a precombustion chamber holder is press-fitted in the precombustion chamber cap holding member.

In some embodiments, for example as illustrated in FIG. 8A, in any one of the above configurations, the precombustion chamber holder 40 may be connected to the precombustion chamber cap holding member 30 by being press-fitted in the large diameter portion 32 of the precombustion chamber cap holding member 30.

With the simple configuration where the precombustion chamber holder 40 is connected to the precombustion chamber cap holding member 30 by press-fitting the precombustion chamber holder 40 in the large diameter portion 32 of the precombustion chamber cap holding member 30, it is possible to achieve the effect described in any one of the present disclosure.

Figure 8B:
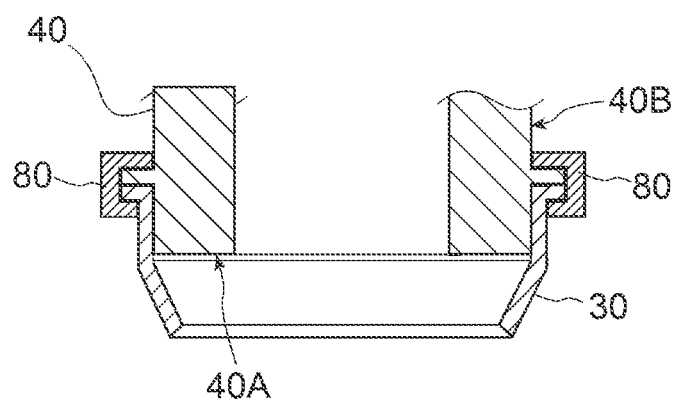
FIG. 8B is a schematic diagram showing a configuration example of a precombustion chamber cap holding member according to another embodiment, where the precombustion chamber cap holding member is connected to a precombustion chamber holder by a clamp.

In some embodiments, for example as illustrated in FIG. 8B, in any one of the above configurations, the precombustion chamber cap holding member 30 may include a clamp 80 for fastening the precombustion chamber holder 40 with the precombustion chamber cap 10.

Thus, when the precombustion chamber cap holding member 30 and the precombustion chamber holder 40 are fastened by the clamp 80, with the simple configuration where the precombustion chamber holder 40 and the precombustion chamber cap 10 are clamped by the clamp 80, it is possible to achieve the effect described in any one of the embodiments of the present disclosure.

At least one embodiment of the present invention provides a precombustion chamber engine with improved ease of assembly.

Embodiments of the present invention were described in detail above, but the present invention is not limited thereto, and various amendments and modifications may be implemented.

REFERENCE SIGNS LIST

1 Precombustion chamber engine
2 Cylinder
21 Cylinder block
22 Cylinder liner

23 Cylinder head
23A Insertion hole
3 Piston
3A Piston top surface
4 Main combustion chamber
5 Intake port
5A Intake valve
6 Exhaust port
6A Exhaust valve
10 Precombustion chamber cap
10A Upper end surface (Facing surface)
10B Outer peripheral surface
11 Precombustion chamber
12 Proximal end portion
12A Outer peripheral surface
13 Reduced diameter portion
14 Intermediate portion
14A Lower end surface (Step portion)
15 Distal end portion
16 Injection port (Injection hole)
17 Second recess
18 Precombustion chamber fuel supply passage
19 Ignition plug
30 Precombustion chamber cap holding member
30A Inner peripheral surface
31 Female threaded portion
32 Large diameter portion
32B Lower end
34 Holding portion (Small diameter portion)
34A Distal end
34B Tapered portion
34C Inner flange portion
40 Precombustion chamber holder
40A Lower end surface (Facing surface)
40B Outer periphery
41 Male threaded portion
43 First recess
50 Seal member (Gasket)
60 Pin member (Protruding member)
70 Fuel gas supply section
80 Clamp
C Central axis
G Gap

The invention claimed is:

1. A precombustion chamber engine, comprising:
a cylinder head defining a main combustion chamber together with a cylinder liner and a piston top surface;
a precombustion chamber cap mounted on the cylinder head by inserting a distal end portion of the precombustion chamber cap into an insertion hole formed in the cylinder head;
a precombustion chamber holder disposed inside the cylinder head; and
a precombustion chamber cap holding member fixed to the precombustion chamber holder and configured to suspend and support the precombustion chamber cap,
wherein the precombustion chamber cap includes a reduced diameter portion with a diameter decreasing from a proximal end portion of the precombustion chamber cap to an intermediate portion that has a smaller diameter than the proximal end portion,
wherein the precombustion chamber cap holding member is configured to lock the reduced diameter portion and to have a gap between the precombustion chamber cap holding member and the proximal end portion when the precombustion chamber cap holding member suspends and supports the precombustion chamber cap, and
wherein, when the precombustion chamber cap is suspended and supported by the precombustion chamber cap holding member, a gap is formed between an upper end surface of the precombustion chamber cap and a lower end surface of the precombustion chamber holder.

2. The precombustion chamber engine according to claim 1,
wherein the precombustion chamber cap holding member includes:
a cylindrical large diameter portion fixed to the precombustion chamber holder; and
a holding portion connected to the cylindrical main portion and disposed below the cylindrical main portion, the holding portion having a distal end disposed closer to a central axis of the precombustion chamber cap than an outer peripheral surface of the proximal end portion is.

3. The precombustion chamber engine according to claim 2,
wherein the precombustion chamber holder includes a male threaded portion formed on an outer periphery of the precombustion chamber holder, and
wherein the precombustion chamber cap holding member includes a female threaded portion formed on an inner periphery of the cylindrical main portion of the precombustion chamber cap holding member to be engaged with the male threaded portion.

4. The precombustion chamber engine according to claim 2,
wherein the holding portion includes a tapered portion formed so as to be closer to the central axis with an increase in distance from the cylindrical main portion along a direction of the center axis.

5. The precombustion chamber engine according to claim 2,
wherein the holding portion includes an inner flange portion protruding inward from a lower end of the cylindrical main portion so as to cross a direction of the central axis.

6. The precombustion chamber engine according to claim 2,
wherein the precombustion chamber holder is connected to the precombustion chamber cap holding member by being press-fitted in the cylindrical main portion of the precombustion chamber cap holding member.

7. The precombustion chamber engine according to claim 1,
wherein the proximal end portion of the precombustion chamber cap has a smaller diameter than the precombustion chamber holder.

8. The precombustion chamber engine according to claim 1, further comprising a seal member interposed between the precombustion chamber holder and the proximal end portion of the precombustion chamber cap or between a lower end surface of the intermediate portion of the precombustion chamber cap and the cylinder head.

9. The precombustion chamber engine according to claim 1,
wherein the precombustion chamber holder includes a first recess on a surface facing the precombustion chamber cap,
wherein the precombustion chamber cap includes a second recess on a surface facing the precombustion chamber holder, and wherein the precombustion chamber engine is configured such that a pin member is fitted in the first recess and the second recess.

10. The precombustion chamber engine according to claim 1, further comprising a fuel gas feeder for supplying gaseous fuel into the main combustion chamber.

11. The precombustion chamber engine according to claim 1,
wherein the precombustion chamber cap holding member includes a clamp for fastening the precombustion chamber holder with the precombustion chamber cap.

* * * * *